United States Patent
Bhalla et al.

(10) Patent No.: US 7,301,922 B1
(45) Date of Patent: Nov. 27, 2007

(54) REAL TIME HANDOFF IN A WIRELESS PACKET DATA NETWORK

(75) Inventors: Rajesh Bhalla, Westmont, IL (US); Gopal K Dommety, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 946 days.

(21) Appl. No.: 09/953,777

(22) Filed: Sep. 17, 2001

(51) Int. Cl.
*H04Q 7/00* (2006.01)

(52) U.S. Cl. .................. 370/331; 455/436; 455/439

(58) Field of Classification Search ............... 370/331, 370/338, 352, 336, 335; 455/439, 436, 574, 455/442; 709/228, 250, 224
See application file for complete search history.

(56) References Cited

U.S. PATENT DOCUMENTS

| | | | |
|---|---|---|---|
| 6,233,458 B1 * | 5/2001 | Haumont et al. ........... 455/445 |
| 6,665,537 B1 | 12/2003 | Lioy ......................... 455/435 |
| 6,907,016 B2 * | 6/2005 | Madour et al. ............. 370/331 |
| 7,065,062 B2 * | 6/2006 | Madour et al. ............. 370/331 |
| 7,139,829 B2 * | 11/2006 | Wenzel et al. .............. 709/232 |
| 7,200,126 B2 * | 4/2007 | Lim ........................... 370/331 |
| 7,227,848 B2 * | 6/2007 | Sayeedi et al. ............. 370/328 |
| 2002/0021681 A1 * | 2/2002 | Madour ...................... 370/331 |
| 2002/0046277 A1 * | 4/2002 | Barna et al. ................ 709/224 |
| 2002/0114293 A1 * | 8/2002 | Madour et al. ............. 370/329 |
| 2002/0141361 A1 * | 10/2002 | Madour et al. ............. 370/331 |
| 2002/0145990 A1 * | 10/2002 | Sayeedi ...................... 370/335 |
| 2003/0028649 A1 * | 2/2003 | Uhlik et al. ................ 709/228 |
| 2003/0063584 A1 * | 4/2003 | Sayeedi ...................... 370/331 |
| 2004/0008645 A1 * | 1/2004 | Janevski et al. ............ 370/331 |

* cited by examiner

*Primary Examiner*—Edan Orgad
*Assistant Examiner*—Chuong T. Ho
(74) *Attorney, Agent, or Firm*—Baker Botts L.L.P.

(57) ABSTRACT

A system, a method, and software for communicating packet data are disclosed. A call is communicated from a mobile device through a first base station controller and a first packet data serving node. The call is transferred from the first base station controller to a second base station controller in communication with a second packet data serving node. The call is then communicated through a tunnel established between the first packet data serving node and the second packet data serving node.

48 Claims, 4 Drawing Sheets

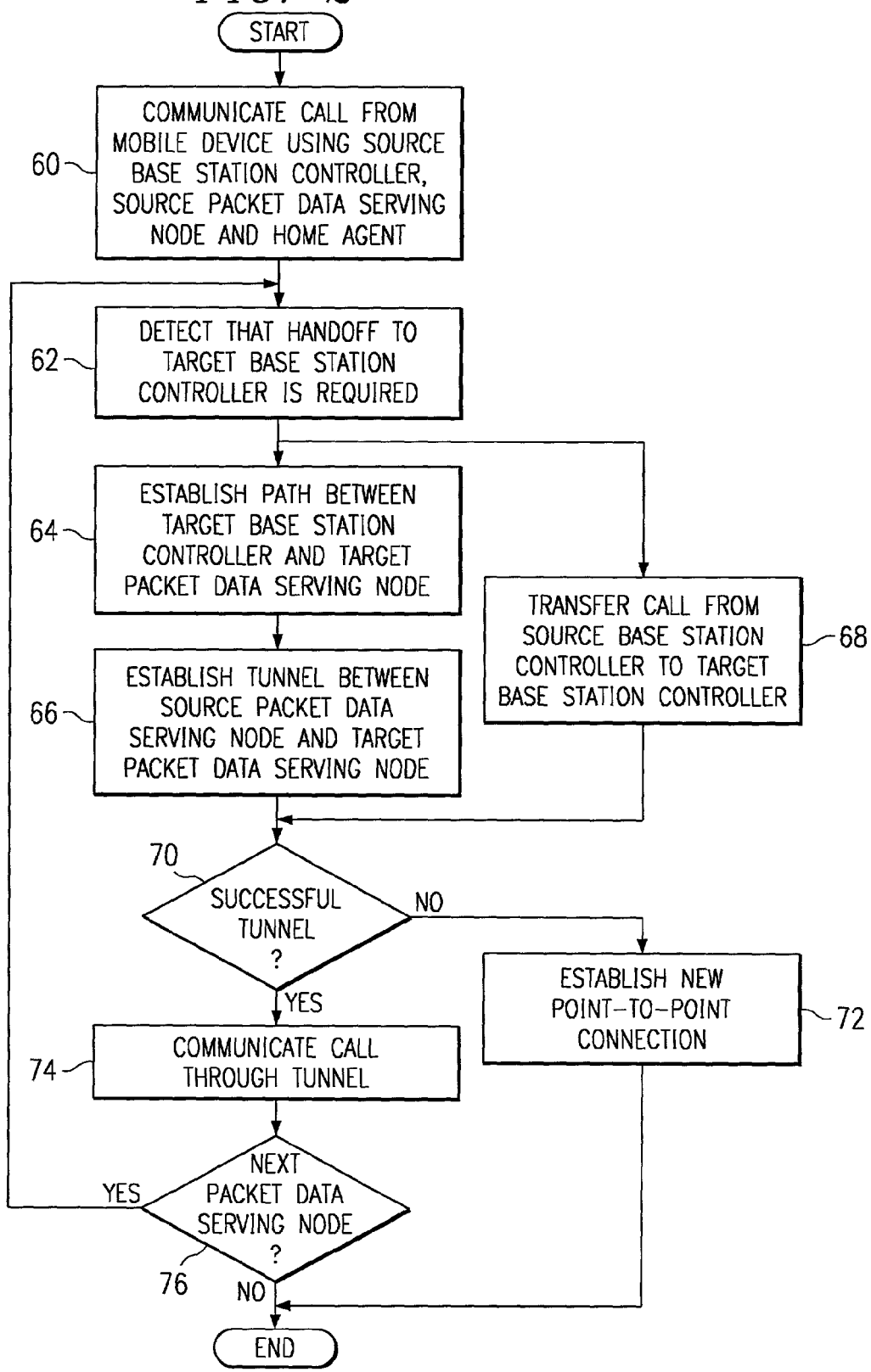

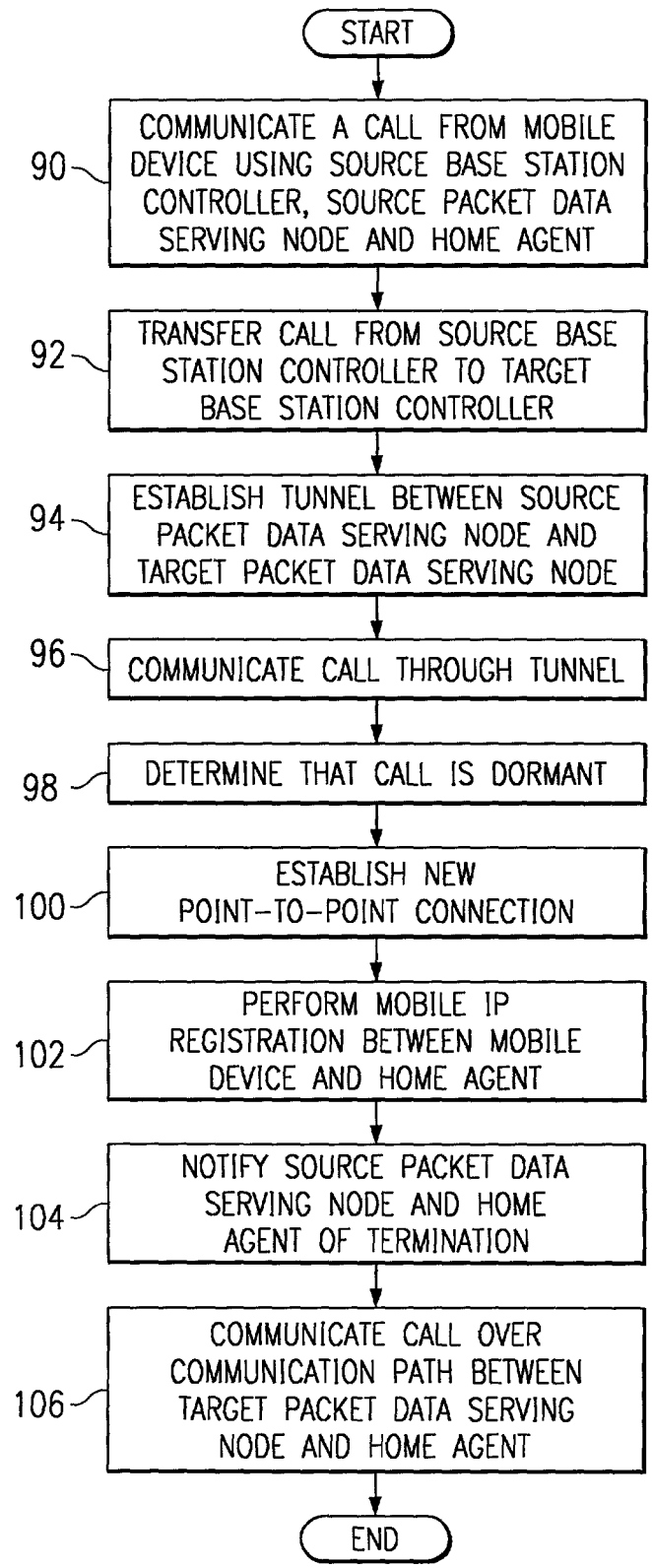

REAL TIME HANDOFF IN A WIRELESS PACKET DATA NETWORK

TECHNICAL FIELD OF THE INVENTION

This invention relates in general to communications networks, and more particularly to a system and method for real time handoff in a wireless packet data network.

BACKGROUND OF THE INVENTION

As a mobile device such as a cellular telephone moves from one location to another location, a call from the mobile device may need to be handed off from one network element to another network element. Handing off a call, however, may cause disruptions. These disruptions may result in data loss or latency. Consequently, disruptions should be minimized when handing off a call.

SUMMARY OF THE INVENTION

In accordance with the present invention, the disadvantages and problems associated real time handoff have been substantially reduced or eliminated. In particular, a system and method for real time handoff in a wireless packet data network are provided.

In accordance with one embodiment of the present invention, a system and method for communicating packet data are disclosed. A call is communicated from a mobile device using a first base station controller and a first packet data serving node. A handoff of the call is requested. The handoff is from the first packet data serving node to a second packet data serving node in communication with a second base station controller. The call is transferred from the first base station controller to the second base station controller. A tunnel is established between the first packet data serving node and the second packet data serving node, and the call is communicated through the tunnel.

Important technical advantages of certain embodiments of the present invention include maintaining a point-to-point session between a mobile device and a packet data serving node during an active stage of a call that is being handed off in order to avoid disrupting the call. A new point-to-point session may be established during a dormant stage of the call, when the call is less likely to be disrupted.

Other important technical advantages of certain embodiments of the present invention include establishing a tunnel between a source packet data serving node and a target packet data serving node. The source packet data serving node has a point-to-point connection with a mobile device that has moved into a location covered by the target packet data serving node. A call from the mobile device may be communicated through the tunnel in order to maintain the point-to-point session.

BRIEF DESCRIPTION OF THE DRAWINGS

For a more complete understanding of the present invention and its advantages, reference is now made to the following description, taken in conjunction with the accompanying drawings, in which:

FIG. 2 is a flowchart illustrating one embodiment of a method for performing a handoff of a call;

FIG. 4 is flowchart illustrating one embodiment of a method for performing a handoff of a call and for establishing a new point-to-point session.

DETAILED DESCRIPTION OF THE INVENTION

Figure 1A:
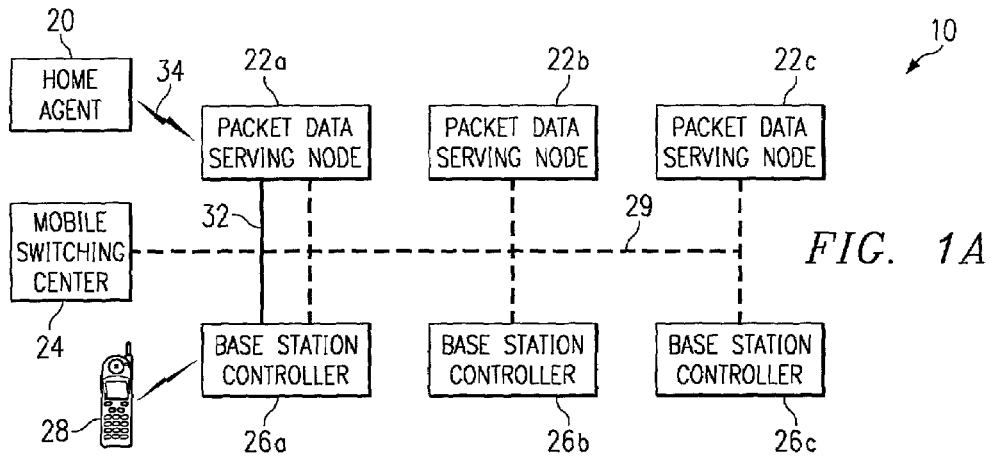
FIGS. 1A through 1C are block diagrams illustrating one embodiment of a system for performing a handoff of a call.

FIG. 1A is a block diagram illustrating one embodiment of a system 10 for communicating packet data which includes, in part, mobile wireless communication devices. System 10 may include, for example, a part of a packet data network. As a mobile device moves from one location to another location, a call may be transferred from one packet data serving node of system 10 to another packet data serving node of system 10. The call may comprise voice or data packets. System 10 communicates the call through a tunnel established between the packet data serving nodes in order to avoid disrupting the call.

System 10 may include a home agent 20, packet data serving nodes 22, a mobile switching center 24, and base station controllers 26, which may be used to process a call comprising packet data received from a mobile device 28. Mobile device 28 may include, for example, a mobile personal computer, a personal digital assistant, a mobile handset, or any other device suitable for communicating packet data to system 10. Mobile device 28 may utilize, for example, code-division multiple access technology or any other suitable mobile communications technology. Mobile device 28 may support, for example, simple Internet Protocol (IP) or mobile IP or any other suitable communications protocol.

Base station controllers 26 provide an interface between mobile device 28 and packet data serving nodes 22. Base station controllers 26 may route a call from mobile device 28 through a base station. The wireless link between mobile device 28 and packet data serving nodes 22 is typically a radio frequency link and is typically cellular in network organization. Packet data serving nodes 22 may establish communication sessions, for example, point-to-point sessions with mobile device 28 in order to provide mobile device 28 access to the packet data network. A communication path 32 may be established over a communication route 33 to transmit data between base station controller 26 and packet data serving node 22. A packet data serving node 22a may establish a tunnel with another packet data serving node 22b in order to perform a handoff of a call from mobile device 28. The tunnel transmits packet data wrapped in a wrapper address. A security association may be established between packet data serving node 22a and packet data serving node 22b such that data transmitted through the tunnel is secure. Packet data serving node 22 may comprise, for example, a CISCO Packet Data Serving Node.

Mobile switching center 24 manages base station controllers 26 through control lines 29, and may also manage communication between system 10, other similar systems, and the rest of an external network. Mobile switching center 24 may include, for example, an open programmable switch such as a CISCO VCO/4K switch, and a system controller program that provides call processing. Mobile switching center 24 may comprise, for example, a CISCO Mobile Switching Center. Home agent 20 records the location of mobile device 28. A communication path 34 may be used to transmit data between packet data serving node 26 and home agent 20.

Figure 1B:
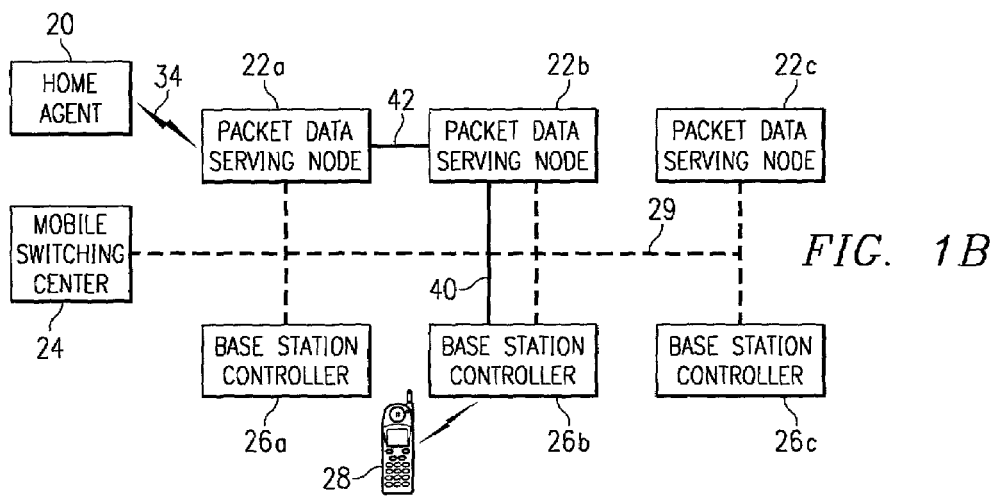
Figure 1C:
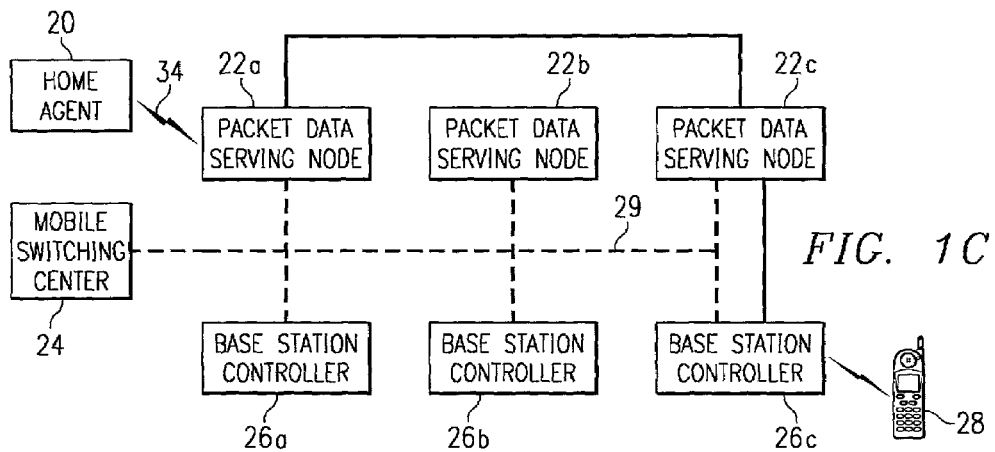

FIGS. 1A through 1C are block diagrams illustrating system 10 performing a handoff of a call from packet data serving node 22a to packet data serving node 22b, and then to packet data serving node 22c as a mobile device moves from the cells managed by base station controller 26a, to the cells managed by base station controller 26b, to the cells managed by base station controller 26c. The handing off of a call is described in more detail in connection with FIG. 2.

FIG. 2 is a flowchart illustrating one embodiment of a method for communicating packet data. According to the method, a call that is transferred from a source base station controller 26a to a target base station controller 26b is communicated through a tunnel between a source packet data serving node 22a and a target packet data serving node 22b, in order to avoid disrupting the call.

The method begins at step 60, where an active call from mobile device 28 is communicated and managed by source base station controller 26a, source packet data serving node 22a, and home agent 20, as illustrated in FIG. 1A. Mobile device 28 is located in a cell of source base station controller 26a and is registered with source base station controller 26a. A point-to-point session between mobile device 28 and source packet data serving node 22a is established. Mobile device 28 communicates data to source base station controller 26a, which in turn communicates the data to source packet data serving node 22a over communication path 32. Source packet data serving node 22a communicates the data to home agent 20 over communication path 34.

At step 62, source base station controller 26a determines that a handoff of the call is required. As mobile device 28 moves from a cell of source base station controller 26a to a cell of target base station controller 26b that is not controlled by source packet data serving node 22a. As illustrated in FIG. 1B, a handoff from source packet data serving node 22a to target packet data serving node 22b may be required. Source base station controller 26a transmits a handoff request message to target base station controller 26b, possibly through mobile switching center 24. The handoff request message may include an airlink record that has the addresses of source packet data serving node 22a. In response, target base station controller 26b returns an acceptance message to base station controller 26a.

At step 64, a communication path 40 is established over communication route 33 between target base station controller 26b and target packet data serving node 22b, as illustrated in FIG. 1B. Communication path 40 may be established by transmitting a connection request message from target base station controller 26b to target packet data serving node 22b. The connection request message may include the airlink record received from source base station controller 26a. In response, target packet data serving node 22b replies with an acceptance message. Communication path 40 is established in response to the acceptance.

At step 66, a tunnel 42 is established between source packet data serving node 22a and target packet data serving node 22b, as illustrated in FIG. 1B. Tunnel 42 allows target packet data serving node 22b to manage data encapsulation such that mobile device 28 does not need to change packet format. Target packet data serving node 22b initiates the establishment of tunnel 42 by assigning a session identifier for tunnel 42 and sending a tunnel request message to source packet data server node 22a. The request for tunnel message may include the session reference identifier and a mobile identifier of mobile device 28, which may be used to identify a specific session of a specific mobile device 28. Source packet data serving node 22a may validate the registration request according to a prearranged security association, record establishment of tunnel 42, and respond with an acceptance message. Source and target packet data serving nodes 22a and 22b may also transmit accounting information to each other.

Step 66 may be performed in an alternative manner, where source packet data serving node 22a initiates the establishment of tunnel 42. At step 66, source packet data serving node 22a initiates the establishment of tunnel 42 by assigning a session identifier for tunnel 42 and sending a tunnel request message to target packet data serving node 22b. The request for tunnel message may include the session reference identifier and a mobile identifier for mobile device 28, which may be used to identify a specific session of a specific mobile device 28. Target packet data serving node 22b may validate the registration request according to a prearranged security association, record establishment of tunnel 42, and respond with an acceptance message. Source and target packet data serving nodes 22a and 22b may also transmit accounting information to each other.

The established tunnel 42 may support a signaling channel and a bearer channel. The signaling channel provides for managing tunnel 42, and may support call connect and disconnect features. Signaling messages may be based on, for example, a mobile IP protocol operating over user datagram protocol/Internet protocol (UDP/IP) or any other suitable protocol. The bearer channel supports in-sequence delivery of data payload. A tunnel framing protocol such as generic routing encapsulation (GRE), IP in IP protocol, Minimal IP Encapsulation protocol, or any other suitable framing protocol may be used to transport data through tunnel 42.

Step 68 may be performed concurrently with steps 64 and 66. The steps of the method, however, may be performed in any suitable order. For example, step 68 may be performed before or after steps 64 and 66. At step 68, the call is transferred from source base station controller 26a to target base station controller 26b, as illustrated in FIG. 1B. Source base station controller 26a instructs mobile device 28 to transfer the call to target base station controller 26b, such that data is communicated between mobile device 28 and target base station controller 26b.

At step 70, packet data serving node 22b determines whether a successful tunnel 42 has been established. If a successful tunnel has not been established, the method proceeds to step 72, where a new point-to-point path is established and a new registration for mobile device 28 is performed. Data is communicated over the new point-to-point path, and the method terminates. New registration for mobile device 28, however, is time-consuming and disruption is possible. Thus, transporting data through tunnel 42 as described at step 74 is more efficient, places less demand on mobile device 28, and is more reliable than performing a new registration.

If a successful tunnel 42 is established at step 70, the method proceeds to step 74, where data is communicated between target base station controller 26b and target packet data serving node 22b, as illustrated in FIG. 1B.

At step 74, data is communicated using tunnel 42. During step 74, packet data serving nodes 22 may transmit data packets framed using a tunnel framing protocol such as generic routing encapsulation (GRE), IP in IP protocol, Minimal IP Encapsulation protocol, or other suitable framing protocol. When receiving data packets through tunnel 42, packet data serving node 22 strips the framing from the data packets and processes the data packets. When transmitting data packets using tunnel 42, packet data serving node 22 encapsulates the data packets in a framing. For example, target packet data serving node 22b strips a framing from a data packet received through tunnel 42 before transmitting the data packet to target base station controller 22b. Target packet data serving node 22b also encapsulates a data packet received from target base station controller 22b in a framing before sending the data packet through tunnel 42.

Target packet data serving node 22b provides transport for packet data between source packet data serving node 22a and target base station 26b, allowing for a point-to-point connection between mobile device 28 and source packet data serving node 22a. Mobile device 28 does not need to change the packet format. Consequently, the call may continue to be active without disruption.

At step 76, target base station controller 26b determines whether a handoff to a next base station controller 26c is required, as illustrated in FIG. 1C. Next packet data serving node 22c may be required if mobile device 28 moves to a cell of a next base station controller 26c that does not communicate with packet data serving node 22b. If next packet data serving node 22c is required, the method returns to step 62, where base station controller 22b determines that a handoff to next base station controller 22c is required. A new communication path 40 and a new tunnel 42 are generated. Packet data serving node 22c becomes the new target packet data serving node, and packet data serving node 22a remains as the source packet data serving node. If next packet data serving node 22c is not required, the method terminates.

Figure 3A:
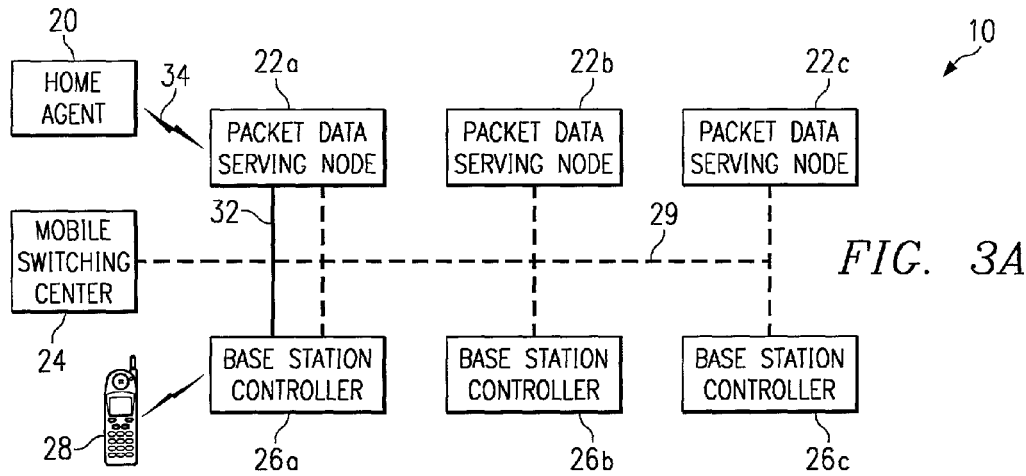
FIGS. 3A through 3C are block diagrams illustrating one embodiment of a system for performing a handoff of a call and for establishing a new point-to-point session.
Figure 3B:
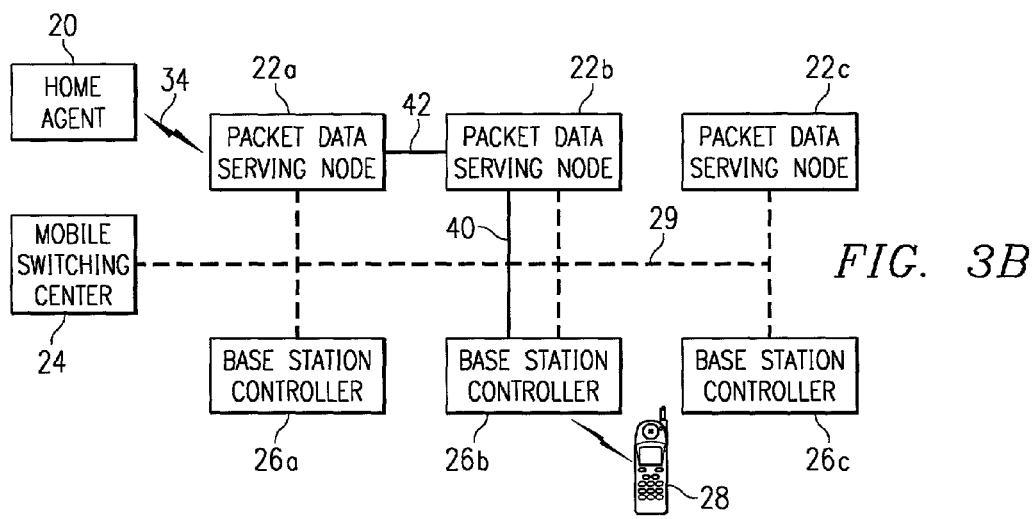
Figure 3C:
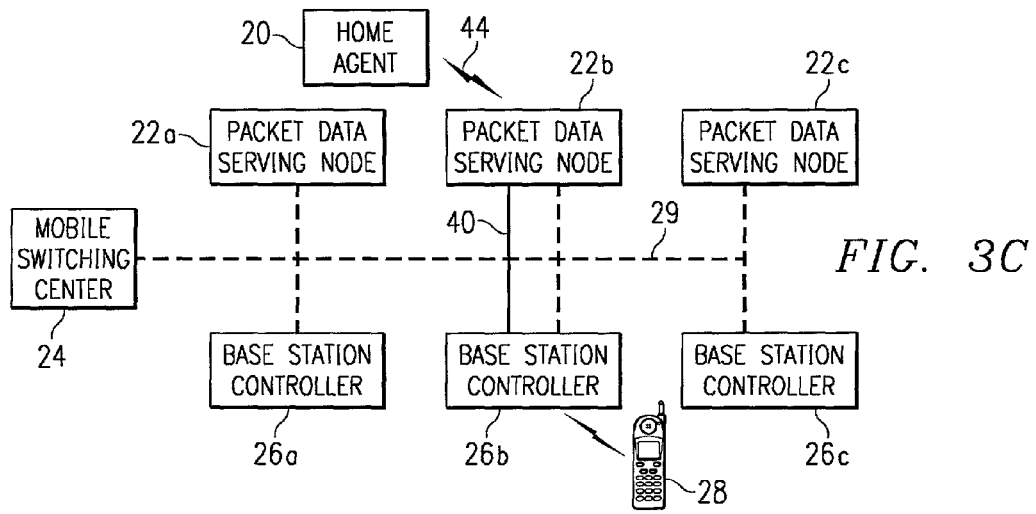

FIGS. 3A through 3C are block diagrams illustrating system 10 of FIG. 1A performing handoff of a call from source packet data serving node 22a to target packet data serving node 22b, which is described in more detail in connection with FIG. 4. In general, FIG. 3A illustrates system 10 communicating an active call from mobile device 28 through packet data serving node 22a. FIG. 3B illustrates communicating the call through packet data serving node 22b, tunnel 42, and packet data serving node 22a, in order to avoid disrupting the call as mobile device 28 moves from one location to another location. FIG. 3C illustrates establishing a new point-to-point session during a dormant stage of the call.

FIG. 4 is a flowchart illustrating one embodiment of a method for communicating data using system 10 of FIGS. 3A through 3C. According to the method, an active call is communicated through a tunnel between source packet data serving node 22a and target packet data serving node 22b, in order to avoid disrupting the active call. A new point-to-point connection is established for target packet data serving node 22b during a dormant stage of the call, where the call is less likely to be disrupted.

Steps 90 through 96 may be performed in a manner substantially similar to that of steps 60 through 74 of FIG. 2. The method begins at step 90, where an active call from mobile device 28 is communicated by source base station controller 26a, source packet data serving node 22a, and home agent 20, as illustrated in FIG. 3A. A point-to-point session between mobile device 28 and source packet data serving node 22a is established.

At step 92, the call is transferred from source base station controller 26a to target base station controller 26b, as illustrated in FIG. 3B. At step 94, tunnel 42 between source packet data serving node 22a and target packet data serving node 22b is established, as illustrated in FIG. 3B. Data is communicated through tunnel 42 at step 96, thus maintaining the point-to-point session between mobile device 28 and source packet data serving node 22a. As a result, data is communicated from mobile device 28 through target base station controller 26b and target packet data serving node 22b to source packet data serving node 22a without disruption.

At step 98, target base station controller 26b determines that the call is dormant, as illustrated in FIG. 3C. A new point-to-point connection is established between target packet data serving node 22b and mobile device 28 at step 100. At step 102, mobile IP registration is performed between mobile device and home agent over the new point-to-point connection, thereby establishing path 44.

At step 104, target packet data serving node 22b notifies source packet data serving node 22a of the termination of tunnel 42. In response, source packet data serving node 22a terminates communication of data through tunnel 42 and returns an acceptance message to target packet data serving node 22b. At step 106, the call is transferred to communication path 44 between packet data serving node 22b and home agent 20. After transferring the call, the method terminates.

Important technical advantages of certain embodiments include maintaining a point-to-point session during an active stage of a call that is being handed off in order to avoid disrupting the call. A new point-to-point session may be established during a dormant stage of the call, when the call is less likely to be disrupted.

Other important technical advantages of certain embodiments include establishing tunnel 42 between source packet data serving node 22a and target packet data serving node 22b. Source packet data serving node 22a has a point-to-point connection with mobile device 28 that has moved into a location covered by target packet data serving node 22b. A call from the mobile device 28 may be communicated through tunnel 42 in order to maintain the point-to-point session.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

The invention claimed is:

1. A method for communicating packet data, the method comprising:
   communicating a call from a mobile device using a first base station controller and a first packet data serving node, the communication of the call comprising:
      establishing a point-to-point session between the mobile device and the first packet data serving node;
   determining a handoff of the call is requested, wherein the handoff is from the first packet data serving node to a second packet data serving node in communication with a second base station controller;
   transferring the call from the first base station controller to the second base station controller, the call being active;
   establishing a tunnel between the first packet data serving node and the second packet data serving node;
   communicating the call through the tunnel;
   determining at the second base station controller when the call transitions from active to dormant; and
   establishing a next point-to-point session between the mobile device and the second packet data serving node in response to the call transitioning from active to dormant; establishing a communication path between the first packet data serving node and a home agent; and communicating the call between the first packet data serving node and the home agent using the communication path.

2. The method of claim 1, wherein establishing the tunnel comprises:
transmitting a request from the second packet data serving node to the first packet data serving node; and
establishing the tunnel in response to the request.

3. The method of claim 1, wherein establishing the tunnel comprises:
transmitting a request from the first packet data serving node to the second packet data serving node; and
establishing the tunnel in response to the request.

4. The method of claim 1, wherein establishing the tunnel comprises:
assigning a session identifier to the call; and
communicating the session identifier from the second packet data serving node to the first packet data serving node.

5. The method of claim 1, wherein establishing the tunnel comprises:
assigning a session identifier to the call; and
communicating the session identifier from the first packet data serving node to the second packet data serving node.

6. The method of claim 1, wherein communicating the call through the tunnel comprises communicating a signaling message through the tunnel.

7. The method of claim 1, wherein communicating the call through the tunnel comprises:
encapsulating data using a tunnel framing protocol; and
transmitting the data through the tunnel.

8. The method of claim 1, further comprising:
terminating the tunnel in response to establishing the next point-to-point session between the mobile device and the second packet data serving node.

9. The method of claim 1, further comprising:
establishing a communication path between the second packet data serving node and a home agent; and
communicating the call between the second packet data serving node and the home agent using the communication path.

10. The method of claim 1, further comprising:
terminating the tunnel; and
communicating the call to a home agent using a communication path between the second packet data serving node and the home agent.

11. The method of claim 1, further comprising establishing a security association between the first packet data serving node and the second packet data serving node.

12. A system for communicating packet data, the system comprising:
a first packet data serving node operable to establish a communication session with a mobile device and to communicate a call from the mobile device, the first data packet serving node operable to establish a point-to-point session between the mobile device and the first packet data serving node; and
a second packet data serving node coupled to the first packet data serving node and operable to:
receive a request for a handoff of the call;
establish a tunnel with the first packet data serving node;
communicate the call through the tunnel while maintaining the communication session;
determine at the second base station controller when the call transitions from active to dormant; and
establish a next point-to-point session between the mobile device and the second packet data serving node in response to the call transitioning from active to dormant; a first base station controller coupled to the first packet data serving node and operable to: receive the call from the mobile device; and transmit the call to the first packet data serving node; and a second base station controller coupled to the second packet data serving node and operable to: receive the call from the mobile device; and transmit the call to the second packet data serving node, wherein the first base station controller is operable to transfer the call to the second base station controller.

13. The system of claim 12, further comprising a home agent coupled to the first packet data serving node, wherein the first packet data serving node is operable to:
establish a communication path with the home agent; and
communicate the call using the communication path.

14. The system of claim 12, wherein the second packet data serving node is operable to transmit a request for establishing the tunnel to the first packet data serving node.

15. The system of claim 12, wherein the first packet data serving node is operable to transmit a request for establishing the tunnel to the second packet data serving node.

16. The system of claim 12, wherein the second packet data serving node is operable to:
assign a session identifier to the call; and
communicate the session identifier to the first packet data serving node.

17. The system of claim 12, wherein the first packet data serving node is operable to:
assign a session identifier to the call; and
communicate the session identifier to the second packet data serving node.

18. The system of claim 12, wherein the second packet data serving node is operable to communicate a signaling message through the tunnel to the first packet data serving node.

19. The system of claim 12, wherein the first packet data serving node is operable to communicate a signaling message through the tunnel to the second packet data serving node.

20. The system of claim 12, wherein the second packet data serving node is operable to:
encapsulate data using a tunnel framing protocol; and
transmit the data through the tunnel.

21. The system of claim 12, wherein the first packet data serving node is operable to:
encapsulate data using a tunnel framing protocol; and
transmit the data through the tunnel.

22. The system of claim 12, further comprising a home agent coupled to the second packet data serving node, wherein the second packet data serving node is operable to:
establish a communication path with the home agent; and
communicate the call using the communication path.

23. The system of claim 12, further comprising a home agent coupled to the second packet data serving node, wherein the second packet data serving node is operable to:
terminate the tunnel; and
communicate the call to the home agent using a communication path between the second packet data serving node and the home agent.

24. The system of claim 12, wherein a security association is established between the first packet data serving node and the second packet data serving node.

25. A computer-readable medium encoded with a software for communicating packet data, the software executed by the computer to:

communicate a call from a mobile device using a first base station controller and a first packet data serving node, the communication of the call comprising establishing a point-to-point session between the mobile device and the first packet data serving node;

determine a handoff of the call is requested, wherein the handoff is from the first packet data serving node to a second packet data serving node in communication with a second base station controller;

transfer the call from the first base station controller to the second base station controller, the call being active;

establish a tunnel between the first packet data serving node and the second packet data serving node;

communicate the call through the tunnel;

determining at the second base station controller when the call transitions from active to dormant; and establishing a next point-to-point session between the mobile device and the second packet data serving node in response to the call transitioning from active to dormant; establishing a communication path between the first packet data serving node and a home agent; and communicate the call between the first packet data serving node and the home agent using the communication path.

26. The software of claim 25, further operable to establish the tunnel by:

transmitting a request from the second packet data serving node to the first packet data serving node; and establishing the tunnel in response to the request.

27. The software of claim 25, further operable to establish the tunnel by:

transmitting a request from the first packet data serving node to the second packet data serving node; and establishing the tunnel in response to the request.

28. The software of claim 25, further operable to establish the tunnel by:

assigning a session identifier to the call; and communicating the session identifier from the second packet data serving node to the first packet data serving node.

29. The software of claim 25, further operable to establish the tunnel by:

assigning a session identifier to the call; and communicating the session identifier from the first packet data serving node to the second packet data serving node.

30. The software of claim 25, further operable to communicate the call through the tunnel by communicating a signaling message through the tunnel.

31. The software of claim 25, further operable to communicate the call through the tunnel by:

encapsulating data using a tunnel framing protocol; and transmitting the data through the tunnel.

32. The software of claim 25, further operable to:

terminate the tunnel in response to establishing the next point-to-point session between the mobile device and the second packet data serving node.

33. The software of claim 10, further operable to:

establish a communication path between the second packet data serving node and a home agent; and communicate the call between the second packet data serving node and the home agent using the communication path.

34. The software of claim 25, further operable to:

terminate the tunnel; and communicate the call to a home agent using a communication path between the second packet data serving node and the home agent.

35. The software of claim 25, further operable to establish a security association between the first packet data serving node and the second packet data serving node.

36. A system for communicating packet data, the system comprising:

means for communicating a call from a mobile device using a first base station controller and a first packet data serving node, the communication of the call comprising establishing a point-to-point session between the mobile device and the first packet data serving node;

means for determining a handoff of the call is requested, wherein the handoff is from the first packet data serving node to a second packet data serving node in communication with a second base station controller;

means for transferring the call from the first base station controller to the second base station controller, the call being active;

means for establishing a tunnel between the first packet data serving node and the second packet data serving node;

means for communicating the call through the tunnel;

means for determining at the second base station controller when the call transitions from active to dormant; and means for establishing a next point-to-point session between the mobile device and the second packet data serving node in response to the call transitioning from active to dormant; means for establishing a communication path between the first packet data serving node and a home agent; and means for communicating the call between the first packet data serving node and the home agent using the communication path.

37. The system of claim 36, wherein means for establishing the tunnel comprises:

means for transmitting a request from the second packet data serving node to the first packet data serving node; and means for establishing the tunnel in response to the request.

38. The system of claim 36, wherein means for establishing the tunnel comprises:

means for transmitting a request from the first packet data serving node to the second packet data serving node; and means for establishing the tunnel in response to the request.

39. The system of claim 36, wherein means for establishing the tunnel comprises:

means for assigning a session identifier to the call; and means for communicating the session identifier from the second packet data serving node to the first packet data serving node.

40. The system of claim 36, wherein means for establishing the tunnel comprises:

means for assigning a session identifier to the call; and means for communicating the session identifier from the first packet data serving node to the second packet data serving node.

41. The system of claim 36, wherein means for communicating the call through the tunnel comprises means for communicating a signaling message through the tunnel.

42. The system of claim 36, wherein means for communicating the call through the tunnel comprises:
   means for encapsulating data using a tunnel framing protocol in an encapsulation framing; and
   means for transmitting the data through the tunnel.

43. The system of claim 36, further comprising:
   means for terminating the tunnel in response to establishing the next point-to-point session between the mobile device and the second packet data serving node.

44. The system of claim 36, further comprising:
   means for establishing a communication path between the second packet data serving node and a home agent; and
   means for communicating the call between the second packet data serving node and the home agent using the communication path.

45. The system of claim 36, further comprising:
   means for terminating the tunnel; and
   means for communicating the call to a home agent using a communication path between the second packet data serving node and the home agent.

46. The system of claim 36, further comprising means for establishing a security association between the first packet data serving node and the second packet data serving node.

47. A system for communicating packet data, the system comprising:
   a first packet data serving node operable to establish a point-to-point session with a mobile device and to communicate a call from the mobile device; and
   a second packet data serving node coupled to the first packet data serving node, a security association established between the first packet data serving node and the second packet data serving node, the second packet data serving node operable to:
      receive a request for a handoff of the call, the call being active;
      establish a tunnel with the first packet data serving node; and
      communicate the call through the tunnel while maintaining the point-to-point session by encapsulating data using a tunnel framing protocol and transmitting the data through the tunnel; and
   a home agent coupled to the second packet data serving node, wherein the second packet data serving node is operable to:
      establish a communication path with the home agent;
      determining at the second base station controller when the call transitions from active to dormant;
      establish a point-to-point session between the mobile device and the second packet data serving node in response to the call transitioning from the active to dormant;
   communicate the call using the communication path; and
   terminate the tunnel.

48. A system for communicating packet data, the system comprising:
   a first packet data serving node operable to establish a point-to-point session with a mobile device and to communicate a call from the mobile device; and
   a second packet data serving node coupled to the first packet data serving node, a security association established between the first packet data serving node and the second packet data serving node, wherein the first packet data serving node is operable to:
      receive a request for a handoff of the call;
      establish a tunnel with the second packet data serving node; and
      communicate the call through the tunnel while maintaining the point-to-point session by encapsulating data using a tunnel framing protocol and transmitting the data through the tunnel; and
   a home agent coupled to the second packet data serving node, wherein the second packet data serving node is operable to:
      establish a communication path with the home agent;
      determining at the second base station controller when the call transitions from active to dormant;
      establish a point-to-point session between the mobile device and the second packet data serving node in response to the call transitioning from the active to dormant;
   communicate the call using the communication path; and
   terminate the tunnel.

* * * * *